United States Patent [19]

Herr

[11] 3,754,360
[45] Aug. 28, 1973

[54] SURVEYOR'S STAKE
[76] Inventor: Robert W. Herr, 2136 Garden Park Dr., Fort Wayne, Ind. 46825
[22] Filed: Dec. 27, 1971
[21] Appl. No.: 212,241

[52] U.S. Cl.................. 52/103, 52/105, 52/155, 135/15 PE
[51] Int. Cl............................................. G01c 15/00
[58] Field of Search.................. 52/104, 103, 155, 52/153, 154, 729; 135/15 PE; 256/21; 85/19, DIG. 3, 10; 61/53

[56] References Cited
UNITED STATES PATENTS
| | | | |
|---|---|---|---|
| 482,381 | 9/1892 | Pearson | 52/152 |
| 258,052 | 5/1882 | Greer | 85/19 |
| 1,320,081 | 10/1919 | Martin | 52/155 |
| 1,745,303 | 1/1930 | Lance | 52/155 |
| 2,154,966 | 5/1939 | Vanderveer | 52/103 |
| 2,773,470 | 12/1956 | Alger | 52/103 |
| 3,123,978 | 3/1964 | Pruyn | 61/53 |
| 3,164,071 | 1/1965 | Rubenstein | 94/1.5 |
| 3,280,829 | 10/1966 | Glendenning | 135/15 PE |
| 3,456,660 | 7/1969 | Borchardt | 135/15 PE |
| 3,635,232 | 1/1972 | Rotheiser | 135/15 PE |
| 3,091,997 | 6/1963 | Byrd | 94/1.5 |

Primary Examiner—John E. Murtagh
Attorney—Harold B. Hood et al.

[57] ABSTRACT

A surveyor's stake which comprises an elongated, molded plastic member including a plurality of gradually, convergently tapered ribs whereby the member has a relatively narrow point end and wider head end. The point end is truncated in a plane perpendicular to the longitudinal dimension of the stake and the head end is provided with a driving flange.

6 Claims, 7 Drawing Figures

Patented Aug. 28, 1973
3,754,360
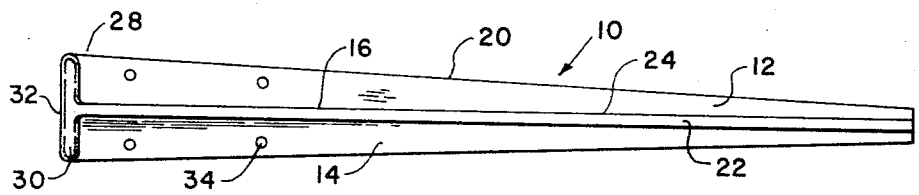
FIG-2
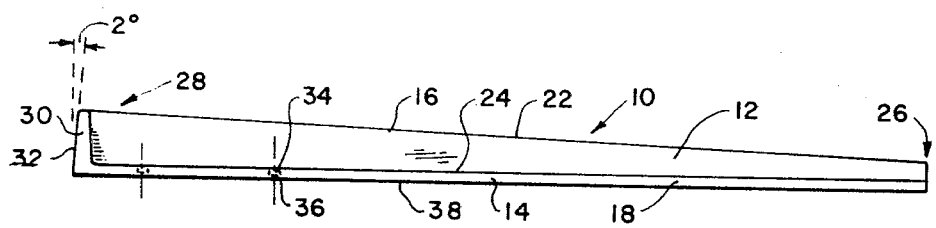 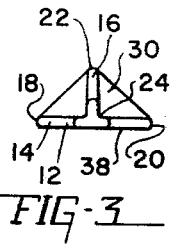
FIG-1  FIG-3
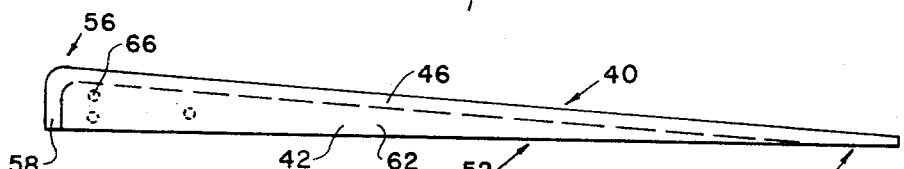 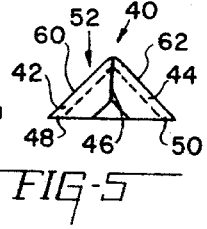
FIG-4  FIG-5
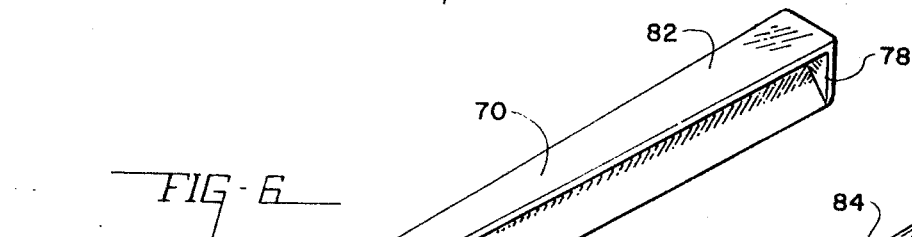
FIG-6
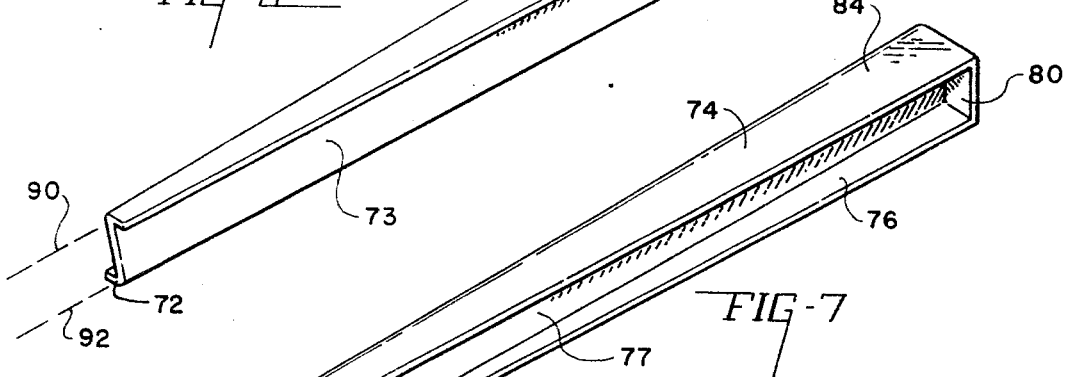
FIG-7

SURVEYOR'S STAKE

BACKGROUND OF THE INVENTION

1. Field of the Invention

The present invention relates to stakes or markers of the type used in surveying sometimes also called "hubs", and in particular to a one piece molded stake having a plurality of tapered ribs forming the body thereof.

2. Description of the Prior Art

In surveying it is common practice to use stakes or hubs driven into the ground at selected points to mark boundaries or to mark cut, grade, and fill information which is needed in the preparation of the terrain preparatory to the construction of a building, road, or the like. Typically, the stakes used for such purposes are simple, elongated pegs made from a wood such as oak. Such stakes are subject to deterioration and become difficult to see after they have been exposed to the elements for any period of time. Such stakes are further subject to splitting. Such stakes are also bulky and relatively heavy.

Such prior wooden stakes do not provide a suitable surface upon which cut, grade and fill information can be written thereby necessitating that a suitable signboard or the like be affixed to the stakes to carry this information.

To overcome these difficulties numerous forms of surveyor's stakes have been proposed which are made of iron or similar material and are provided with diverse means for affixing information to the stake. However, these latter mentioned stakes, due to the material used, are still bulky to handle and the information carrying means provided thereon have rendered the stakes more costly. Both the wooden and metal stakes, because of the material used, their shape, and the difficulty of their being seen when installed, are frequently tripped or driven over thereby causing injury to personnel and vehicles.

SUMMARY OF THE INVENTION

Broadly, the invention is a surveyor's stake or the like comprising an elongated body formed of a single piece of molded plastic material, the body including a plurality of generally flat, elongated ribs joined along a longitudinal dimension thereof. The longitudinal edges of the ribs distal their juncture are tapered toward a common point whereby the elongated member has a relatively narrow point end and a wider head end.

Preferably the narrow end of the stake is truncated in a plane perpendicular to the juncture to reduce the tendency of the stake to cock or diverge from a true course when driven into the ground and the wider end of the member is provided with a flange to facilitate driving of the stake.

At least one of the ribs of the stake includes an outwardly facing, flat, scribeable surface with all of the other ribs of the member being disposed oppositely thereof. The outwardly facing surface provides a convenient and effective means for writing cut, fill, and grade information on the stake.

In a specific embodiment the ribs are gradually and uniformly tapered and the flange is provided with a taper to direct or vector the hammer blows directed thereagainst.

In yet another specific embodiment of the invention, the aforementioned outwardly facing surface may be provided with a plurality of holes having a closure membrane therein which is coplanar with the scribing surface, the holes providing a means for affixing an indicia bearing device such as a signboard, tag or the like to the stake without interferring with the suitability of the scribing surface for writing directly thereupon.

It is therefore an object of the invention to provide a surveyor's stake or the like which is molded from a single, homogeneous piece of plastic material.

It is another object of the invention to provide such a stake having a scribing surface as an integral portion thereof.

It is yet another object of the invention to provide a surveyor's stake or the like which follows a true course when driven into the ground.

It is still another object of the invention to provide a stake having means for affixing a signboard, tag or the like thereto.

It is still another object of the invention to provide a surveyor's stake or the like which is easily seen and light in weight.

It is another object of the invention to provide a surveyor's stake or the like which is simple in construction and economical to use.

Another object of the invention is to provide such a stake which reduces the risk of injury to personnel and damage to vehicles.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side plan view of one embodiment of a surveyor's stake in accordance with the present invention;

FIG. 2 is a top plan view of the stake of FIG. 1;

FIG. 3 is an end plan view of the stake as viewed from the right in FIG. 1;

FIG. 4 is a side plan view of a second embodiment of a surveyor's stake in accordance with the present invention;

FIG. 5 is an end view of the stake of FIG. 4;

FIG. 6 is a perspective showing another embodiment of a surveyor's stake in accordance with the present invention; and FIG. 7 is a perspective view of yet another embodiment of a surveyor's stake in accordance with the present invention.

DESCRIPTION OF THE PREFERRED EMBODIMENT

Referring now to the drawings, there is illustrated in FIGS. 1 through 3 a surveyor's stake, indicated generally at 10, which comprises an elongated, homogeneous member 12. Member 12 includes a plurality of elongated, generally flat ribs 14 and 16 which are joined along a juncture line 24 parallel to the longitudinal dimension thereof. The edges 18 and 20 of rib 14 and edge 22 of rib 16 distal the juncture 24 of rib 14, 16 are uniformly, convergently tapered whereby member 12 has a relatively narrow point end 26 and a wider, head end 28.

Point end 26 is preferably truncated or cut off in a plane perpendicular to the juncture line 24. This truncation of end 26 has been found to reduce or eliminate the tendency of the stake 10 to cock or otherwise diverge from a straight course when it is driven into the earth.

Also formed integrally as a homogeneous part of the member 12 is a driving flange 30 which is disposed in a plane generally perpendicular to juncture 24. Flange 30 is made of sufficient thickness to withstand repeated hammer blows thereon without breaking or destruction thereof. In the illustrated embodiment, flange 30 is triangular in shape with the apices thereof being disposed contiguous with the adjacent extremities of edges 18, 20 and 22. Preferably, the surface 32 of flange 30 is tapered at an angle extending from rib 14 towards point end 26 at an angle of approximately 2° with respect to a plane perpendicular to juncture line 24. It has been found that this taper directs or vectors hammer blows upon flange 30 such that member 12 follows a true course when driven into the ground.

A plurality of holes as at 34 are provided in rib 14 adjacent head end 28 of member 12 as shown. The holes 34 are provided with an integral closure membrane 36 which is coplanar with the surface 38. Holes 34 are proportioned frictionally to receive therethrough suitable nails or similar type fasteners thereby to provide a convenient means for affixing an idicia bearing device such as a signboard (not shown) to the head end 28 of member 12. It will be apparent that, when a signboard is thus affixed to member 12, closure membranes 36 will be ruptured. Alternatively, membranes 36 can be ruptured and a suitable tag or the like affixed to the stake with a fastening wire, string or the like.

In an alternative use, the stakes of the present invention can be used to support and position concrete and the like forms such as are used in making sidewalks. In this application, holes 34 provide a suitable and convenient means for nailing the forms to the stakes.

It will be observed that surface 38 of rib 14 is disposed outwardly thereof in a direction opposite to rib 16. Surface 38 is also of substantial width and thereby provides a scribing surface, that is, a surface upon which information, such as cut, fill, and grade data, may be written by a surveyor or other user with a device such as a felt-tipped pen. To this end, it is desirable that surface 38 have a finely gritty texture as opposed to a highly polished surface. It will be apparent that the closure membranes 36 by reason of their disposition in holes 34, enable the entire surface 38 to be written upon without the inconvenience of avoiding the holes 34.

Because the upper surface 32 of the flange 30 is also relatively smooth and will remain so even after the stake is driven into the ground, the surface 32 also provides a suitable scribing surface which can be marked with a pen or pointed object to precisely locate points or to position a plumb bob or the like. This obviates the need for driving tacks into the upper surface of the stake as is normally necessary when using wood stakes the upper surfaces of which are generally mutilated and rough due to the "end" grain of the wood and the effects of pounding.

It will further be apparent that the entire stake 10 can be fabricated in a single molding operation whereby manufacture of the stake is highly economical. The stakes may be molded of any suitable moldable plastic such as, for example, glass fiber filled polystyrene. Other plastics adapted for injection molding or compression molding and which possess the desired structural strength may also be used.

Preferably the plastic from which stake 10 is molded is also pigmented with one of the available pigments, preferably a fluorescent pigment such as red, whereby the stake may be more easily seen. It will further be apparent that, due to the rib structure of the stake, it is of light weight and yet possesses sufficient structural strength for its intended use thereby rendering the stake more easily handled and transported and especially under circumstances where the stake must be carried by hand. Some of the edges 18, 20, and 22, and the edges of the flange 30 are rounded or beveled thereby reducing the chances of injury to personnel or vehicles. Further, the ribbed structure of the stake, while rendering the stake sufficiently strong for its intended use, still permits the stake to bend or break when driven over thereby further enhancing the safeness of the stake.

Referring now to FIGS. 4 and 5, there is illustrated another embodiment of a surveyor's stake 40 in accordance with the present invention. This stake again includes a pair of elongated, generally flat ribs 42, 44 each of which is joined to the other along the longitudinal edge thereof as at 46.

Preferably, ribs 42, 44 have their distal edges 48, 50 respectively, uniformly and convergently tapered thereby forming an elongated member 52 having a relatively narrow point end 54 and a wider head end 56 and point end 54 is again truncated to improve the insertion characteristic of the stake. Head end 56 has formed thereon a suitable driving flange 58 of triangular configuration and having its apices contingent with the tapered edges 48, 50 and the juncture line 46 of ribs 42, 44. Flange 58 may again be provided with a small taper to direct hammer blows thereagainst. In this embodiment, either surface 60 or surface 62 of ribs 42, 44, respectively provides a suitable scribing surface, and either or both ribs 42, 44 may be provided with suitable holes as at 66 for affixing a signboard, tag or the like to the stake 40. Holes 66 are in all other respects identical to holes 34 described in conjunction with the embodiment of FIGS. 1 through 3.

Referring now to FIGS. 6 and 7, there are shown, respectively, third and fourth embodiments of a surveyor's stake in accordance with the invention, the embodiment in FIG. 6 showing a stake having a Z cross-section and the embodiment of FIG. 7 having an I or H cross-section. It will be observed that the embodiments of FIGS. 6 and 7 include a plurality of generally flat, elongated ribs 70, 72, and 74, 76, respectively, which are uniformly, convergently, tapered. Ribs 70, 72 of the embodiment of FIG. 6 are integrally joined by rib 73, and ribs 74, 76 of the embodiment of FIG. 7 are integrally joined by rib 77. Ribs 73 and 77 are of uniform width for the full extent of their length. In each of these latter embodiments, it will be observed that there are two juncture lines in each. In the embodiment of FIG. 6, ribs 70, 73 are joined along line 90, and ribs 72, 73 are joined along juncture line 92, while in the embodiment of FIG. 7, ribs 74 and 77 and ribs 76, 77 are joined along juncture lines 94, 96 respectively. Each of the stakes of FIGS. 6 and 7 is also provided with a driving flange 78, 80, respectively. As with the previous embodiments, the embodiments of FIGS. 6 and 7 provide a scribing surface 82, 84, respectively, disposed outwardly of the ribs and which may be provided with suitable holes and closure membranes (not shown) for the purpose of affixing signboards, tags or the like thereto.

In each of the embodiments of FIGS. 4 through 7, the stake is again molded in a single, homogeneous piece, has primarily rounded edges, and preferably is pigmented with a fluorescent pigment to enhance the safeness and visibility of the stakes. All are light-weight and easily handled. All are of sufficient strength and yet will not cause serious injury to personnel or the tires of vehicles if tripped or driven over.

While the ribs of the stakes shown in FIGS. 1 through 7 have been shown to be uniformly tapered, it will be obvious to those skilled in the art that the taper could also be curved, irregular, or otherwise non-uniform. Similarly, while T, V, I or H, and Z cross-sections have been shown, it will be apparent that other cross-sectional shapes can be used such as, for example, rectangular, or X cross-sections. Other cross-sections will also be apparent.

In a specific embodiment of the invention made in accordance with the embodiment illustrated in FIGS. 1 through 3, the following dimensions were used:

length 18 inches
rib 14 head end, 2 inches; point end, seven-sixteenth inch
rib 16 head end, seven-eighths inch; point end, one-fourth inch
thickness of ribs, one-eighth inch
thickness of flange 30, one-fourth inch; taper angle of flange upper surface 32, 2°
holes 34, three-sixteenth inch diameter
closure membrane 36, 0.020 inch
weight, 0.136 pounds using a plastic having a specific gravity of 1.05.

While there have been described above the principles of this invention in connection with specific apparatus, it is to be clearly understood that this description is made only by way of example and not as a limitation to the scope of the invention.

What is claimed is:

1. A surveyor's stake or the like comprising a plurality of generally flat, elongated ribs, each of said ribs being integrally joined to another of said ribs along a juncture line parallel to the longitudinal dimensions thereof to form an elongated and homogeneous member having a "Tee" cross-section, the distal longitudinal edges of said ribs being uniformly and convergently tapered such that said member has a relatively narrow point end and a wider head end, and a driving flange integrally joined to said wider end and disposed generally perpendicular to the longitudinal dimensions of said ribs, said flange and said ribs being molded of a single, homogeneous piece of moldable plastic material, said flange having a thickness substantially greater than the thickness of said ribs, said plastic material including a luminescent pigment therein, at least one of said ribs including a generally flat, outwardly facing and gritty surface adapted for writing thereon, all other of said ribs being disposed oppositely of said surface, said flange having an upper surface disposed oppositely of said ribs which is tapered at a small angle with respect to a plane perpendicular to said ribs to thereby direct hammer blows thereagainst when the stake is driven into the ground.

2. The stake of claim 1 further comprising a means for securing articles to said surface, said securing means including at least one hole in and perpendicular to said surface adjacent said head end; said hole being dimensioned frictionally to receive a nail therethrough.

3. The stake of claim 1 wherein there are two of said ribs, the cross-section of said member being Tee shaped, one of said ribs being generally in the shape of an equilateral triangle having two said tapered edges and being essentially twice the width of the other of said ribs, the other of said ribs being generally right triangular and joined to said one rib along a line equidistant from said tapered edges thereof, said flange being triangular and having the apices thereof contiguous to the adjacent extremities of said tapered edges, said outwardly facing surface being that surface of said one rib opposite said other rib.

4. The stake of claim 3 wherein the upper surface of said flange extends from said one rib towards said narrow end at an angle of 2° with respect to a plane normal to said juncture line.

5. The stake of claim 3 wherein said narrow end is truncated in a plane perpendicular to the longitudinal dimension of said member.

6. A surveyor's stake or the like comprising a plurality of generally flat, elongated ribs, each said rib being integrally joined to another of said ribs along a juncture line parallel to the longitudinal dimensions thereof to form an elongated and homogeneous member, the distal longitudinal edges of said ribs being convergently tapered such that said member has a relatively narrow point end and a wider head end, and a driving flange integrally joined to said wider end and disposed generally perpendicular to the longitudinal dimensions of said ribs, at least one of said ribs including an outwardly facing surface adapted for writing thereon and integrally formed therewith, all other of said ribs being disposed oppositely of said surface, means for securing an indicia carrying device to said surface, said securing means including at least one hole in and perpendicular to said surface adjacent to said head end, each said hole including a thin pierceable closure membrane coplanar with said outwardly facing surface.

* * * * *